(12) United States Patent
Aiura et al.

(10) Patent No.: US 7,508,177 B2
(45) Date of Patent: Mar. 24, 2009

(54) METHOD AND CIRCUIT FOR REDUCING REGULATOR OUTPUT NOISE

(75) Inventors: Masami Aiura, Sendai (JP); Satoshi Takahashi, Sendai (JP)

(73) Assignee: Freescale Semiconductor, Inc., Houston, TX (US)

( * ) Notice: Subject to any disclaimer, the term of this patent is extended or adjusted under 35 U.S.C. 154(b) by 129 days.

(21) Appl. No.: 11/759,944

(22) Filed: Jun. 8, 2007

(65) Prior Publication Data

US 2008/0303492 A1   Dec. 11, 2008

(51) Int. Cl.
*G05F 1/575* (2006.01)
*G05F 1/563* (2006.01)

(52) U.S. Cl. .................. 323/268; 323/274; 323/284

(58) Field of Classification Search ............. 323/225, 323/268, 273, 274, 282, 284, 285, 350
See application file for complete search history.

(56) References Cited

U.S. PATENT DOCUMENTS 6,229,289 B1 *  5/2001  Piovaccari et al. .......... 323/268

7,064,531 B1 *  6/2006  Zinn .......................... 323/268
7,148,670 B2 * 12/2006  Inn et al. .................... 323/283
7,304,464 B2 * 12/2007  Weng et al. ................. 323/285

FOREIGN PATENT DOCUMENTS

JP   2005130622 A   5/2005
JP   2005198484 A   7/2005

* cited by examiner

*Primary Examiner*—Gary L Laxton
(74) *Attorney, Agent, or Firm*—Charles Bergere

(57) ABSTRACT

A regulator circuit for reducing the output noise when regulators are switched includes a linear regulator and a switching regulator. The linear regulator generates a first regulator voltage from an input voltage with a first feedback loop. The switching regulator generates a second regulator voltage from the input voltage with a second feedback loop, which is connected to the first feedback loop. A loop control circuit controls the first feedback loop so as to lower the first regulator voltage when the switching regulator is activated.

9 Claims, 2 Drawing Sheets

METHOD AND CIRCUIT FOR REDUCING REGULATOR OUTPUT NOISE

BACKGROUND OF THE INVENTION

The present invention relates to a regulator circuit, and more particularly, to reducing output noise when switching between a switching regulator and a linear regulator.

FIG. 1 is a schematic block diagram of a conventional regulator circuit 10. The regulator circuit 10 includes a linear regulator 12 and a switching regulator 14, each supplied with input voltage VIN from a power supply.

The linear regulator 12 is a low dropout (LDO) circuit that generates a first regulator voltage OUT1 having substantially the same level as the input voltage VIN. The linear regulator 12 includes a p-channel MOS transistor T1, which receives the input voltage VIN, and feeds back the first regulator voltage OUT1 output from the transistor T1 to an error amplifier 20 via a node N1 connecting resistors 16 and 18. The error amplifier 20, which is activated by an enable signal LDOEN, compares the first regulator voltage OUT1, which is received via a feedback loop FB1, with a reference voltage Vref. The error amplifier 20 generates a drive voltage V1 for driving the transistor T1 to compensate for fluctuations in the first regulator voltage OUT1 based on the comparison result of the voltages OUT1 and Vref.

The switching regulator 14 is a DCDC converter (also referred to as DDC) that includes a p-channel MOS transistor T2, which receives the input voltage VIN, and an n-channel MOS transistor T3, which is connected between the transistor T2 and ground. The switching regulator 14 controls the on-duty cycle of the transistors T2 and T3 to charge current to a coil L1, which is connected to a node N2 between the transistors T2 and T3, and accumulates charge corresponding to the current in a capacitor C1. In this manner, the switching regulator 14 generates a substantially constant stable second regulator voltage OUT2. The switching regulator 14 feeds back the second regulator voltage OUT2 to a DCDC control circuit 22 via a feedback loop FB2 (coil L1).

The DCDC control circuit 22 includes an error amplifier 22A and a signal processing circuit 22B, which are activated by an enable signal DDCEN. The error amplifier 22A compares the second regulator voltage OUT2 with a target voltage, that is, a reference voltage supplied to the error amplifier 22A, and generates an amplification signal corresponding to the comparison result. The signal processing circuit 22B, which includes an oscillator and a PWM comparator (not shown), generates a pulse signal SP by combining the oscillation signal of the oscillator and the amplification signal of the error amplifier 22A with the PWM comparator. A pre-driver 24 uses the pulse signal SP to generate drive signals VH and VL for respectively driving the transistors T2 and T3. The DCDC control circuit 22 thus controls the transistors T2 and T3 to maintain the second regulator voltage OUT2 at the target voltage.

The regulator circuit 10 generates an output voltage OUT using one of the first regulator voltage OUT1, which is generated by the linear regulator 12, and the second regulator voltage OUT2, which is generated by the switching regulator 14. The regulator circuit 10 supplies the output voltage OUT to an internal circuit (not shown) as operational power.

The feedback loop FB2 of the switching regulator 14 is connected to the feedback loop FB1 of the linear regulator 12. Thus, the feedback loop FB2 of the switching regulator 14 is affected by the first regulator voltage OUT1 when switching the output voltage OUT of the regulator circuit 10 from the first regulator voltage OUT1 to the second regulator voltage OUT2. This problem will now be described with reference to FIGS. 2 and 3.

FIG. 2 is a timing chart showing an output switching sequence of the regulator circuit 10. During period t1, the linear regulator 12 is activated by the enable signal LDOEN having an H level, and the switching regulator 14 is inactivated by the enable signal DDCEN having an L level.

At time t2, the enable signal LDOEN falls, and the enable signal DDCEN rises. Therefore, the linear regulator 12 is inactivated. Simultaneously, the switching regulator 14 is activated. Specifically, the DCDC control circuit 22 is activated, and the transistors T2 and T3 operate in response to the drive signals VH and VL. As a result, the current corresponding to the input voltage VIN charges the coil L1, and the second regulator voltage OUT2 gradually rises.

The current does not charge the coil L1 when the switching regulator 14 is initially activated. In such a case, in the conventional regulator circuit 10, a voltage drop (noise) occurs in the output voltage OUT, as shown in FIG. 2.

FIG. 3 is a timing chart showing another output switching sequence of the regulator circuit 10. At time t3, the enable signal DDCEN rises so that the linear regulator 12 and the switching regulator 14 are both activated. Subsequently, at time t4, the enable signal LDOEN falls and the linear regulator 12 is inactivated. That is, the linear regulator 12 is driven together with the switching regulator 14 in an overlapping manner during the period of time t3 to t4.

Japanese Laid-Open Patent Publication No. 2005-198484 discloses such overlap control. However, even when the overlap control shown in FIG. 3 is executed, output noise may be produced by offsets in the error amplifier 22A caused by manufacturing variations. Such output noise may be generated due to the reference voltage (i.e., target voltage) of the error amplifier 22A being lower than the originally intended target voltage (designed voltage). In this case, the feedback voltage (substantially, voltage OUT1) supplied to the error amplifier 22A via the feedback loop FB2 would be higher than the target voltage. Therefore, the signal processing circuit 22B generates the pulse signal SP to lower the second regulator voltage OUT2. As a result, voltage drop (undershoot) occurs in the output voltage OUT of the regulator circuit 10.

Japanese Laid-Open Patent No. 2005-130622 discloses a switching regulator in which capacity is lowered from that for normal operation when switching from a linear regulator to the switching regulator in order to prevent undershoot. However, such method lowers the activation speed of the switching regulator.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
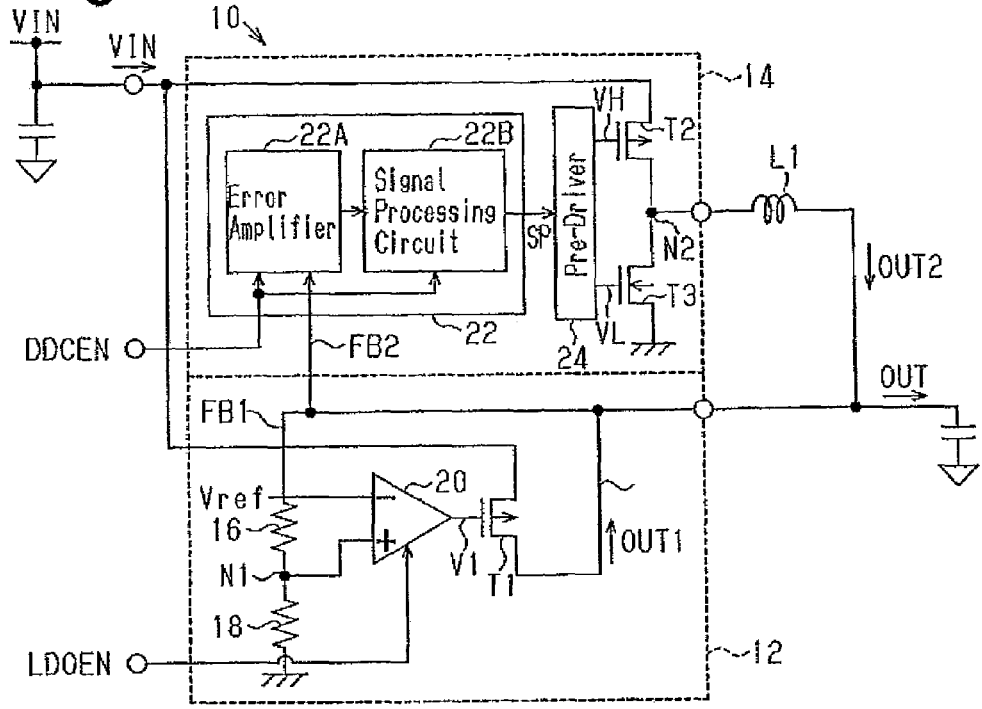
FIG. 1 is a schematic block diagram of a conventional regulator circuit.

In the drawings, like numerals are used for like elements throughout.

The present invention provides a circuit and a method for reducing output noise when a switching regulator is activated.

One aspect of the present invention is a regulator circuit for receiving an input voltage. The regulator circuit is provided with a linear regulator, including a first feedback loop, for generating a first regulator voltage from the input voltage with the first feedback loop. A switching regulator, including a second feedback loop connected to the first feedback loop, generates a second regulator voltage from the input voltage with the second feedback loop. A loop control circuit, connected to the first feedback loop, controls the first feedback loop to lower the first regulator voltage that is to be generated by the linear regulator when the switching regulator is activated.

A further aspect of the present invention is a method for controlling a regulator circuit receiving an input voltage and including a linear regulator and a switching regulator. The method includes generating a first regulator voltage from the input voltage by activating the linear regulator that includes a first feedback loop, and generating a second regulator voltage from the input voltage by activating the switching regulator that includes a second feedback loop. The second feedback loop is connected to the first feedback loop. The method further includes controlling the first feedback loop so as to lower the first regulator voltage that is to be generated by the linear regulator when the switching regulator is activated.

Other aspects and advantages of the present invention will become apparent from the following description, taken in conjunction with the accompanying drawings, illustrating by way of example the principles of the invention.

A regulator circuit 100 according to an embodiment of the present invention will now be described with reference to FIGS. 4 and 5.

Figure 4:
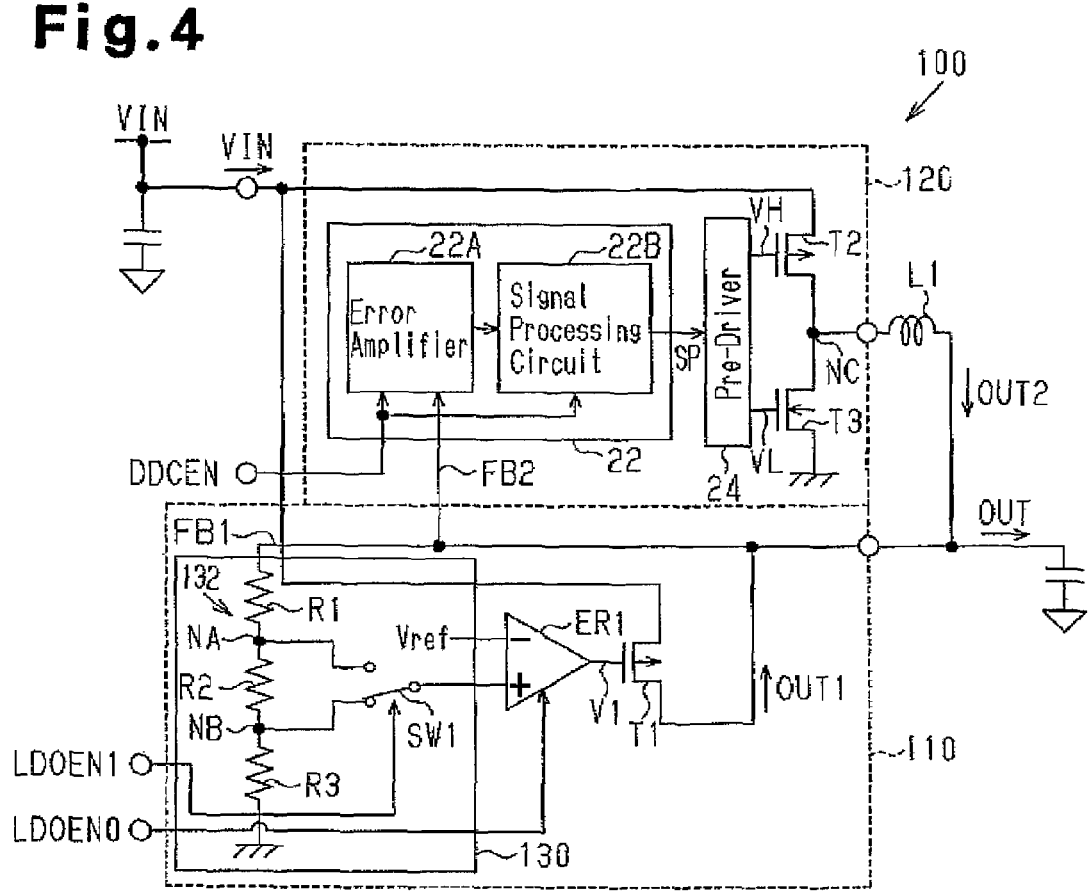
FIG. 4 is a schematic block diagram of a regulator circuit according to an embodiment of the present invention.

FIG. 4 is a schematic block diagram of the regulator circuit 100. FIG. 5 is a timing chart showing a switching sequence of the regulator circuit 100 of FIG. 4. In the regulator circuit 100, the same reference characters are used for components that are the same as those used in the regulator circuit 10 of FIG. 1.

The regulator circuit 100 includes a linear regulator 110 and a switching regulator 120, each supplied with an input voltage VIN from a power supply. The linear regulator 110 is an LDO circuit that generates a first regulator voltage OUT1 having substantially the same level as the input voltage VIN. The linear regulator 110 includes a transistor T1, an error amplifier ER1, and a loop control circuit 130.

The transistor T1, which is a p-channel MOS transistor, includes a source for receiving the input voltage VIN, a drain for outputting the first regulator voltage OUT1, and a gate. The error amplifier ER1 includes an inverting input terminal for receiving a reference voltage Vref, a non-inverting input terminal connected to the loop control circuit 130, and an output terminal connected to the gate of the transistor T1. The error amplifier ER1 is activated and inactivated by an enable signal LDOEN0. In the embodiment, the error amplifier ER1 is activated by an enable signal LDOEN0 having an H level and inactivated by an enable signal LDOEN0 having an L level.

The loop control circuit 130 includes a resistor circuit 132 and a switch circuit SW1. The resistor circuit 132 includes three resistor elements R1, R2, and R3 connected in series between the drain of the transistor T1 and the ground in the embodiment. The switch circuit SW1 is, for example, a three-terminal switch and includes a first switching terminal connected to a first node NA between the resistor elements R1 and R2, a second switching terminal connected to a second node NB between the resistor elements R2 and R3, and a common terminal connected to the non-inverting input terminal of the error amplifier ER1. The switch circuit SW1 is switched by an enable signal LDOEN1. In the preferred embodiment, the common terminal of the switch circuit SW1 connects to the second switching terminal in response to an enable signal LDOEN1 having an H level and to the first switching terminal in response to an enable signal LDOEN1 having an L level.

When the common terminal of the switch circuit SW1 is connected to the second switching terminal, the first regulator voltage OUT1 is fed back to the error amplifier ER1 through the second node NB of the feedback loop FB1. That is, the potential at the second node NB is applied to the non-inverting input terminal of the error amplifier ER1. In this case, the first regulator voltage OUT1 is expressed by the following equation.

$$OUT1 = Vrefx(R1+R2+R3)/R3 \qquad \text{(Equation 1)}$$

When the common terminal of the switch circuit SW1 is connected to the first switching terminal, the first regulator voltage OUT1 is fed back to the error amplifier ER1 through the first node NA of the feedback loop FB1. That is, the potential at the first node NA that is higher than the potential at the second node NB is applied to the non-inverting input terminal of the error amplifier ER1. In this case, the first regulator voltage OUT1 is expressed by the following equation.

$$OUT1 = Vrefx(R1+R2+R3)/(R2+R3) \qquad \text{(Equation 2)}$$

The first regulator voltage OUT1 that is to be generated by the linear regulator 110 thus decreases when the connection of the common terminal of the switch circuit SW1 is switched from the second switching terminal to the first switching terminal. In other words, the target voltage of the linear regulator 110 decreases from the level expressed by equation 1 to the level expressed by equation 2. The lowered range of the target voltage, that is, the value of the resistor R2, is set so as to appropriately compensate for the offset in the error amplifier 22A of the switching regulator 120 resulting from manufacturing variations.

The error amplifier ER1 compares the reference voltage Vref and the first regulator voltage OUT1 received via the feedback loop FB1. Based on the comparison result, the error amplifier ER1 generates a drive voltage V1 for driving the transistor T1 to compensate for fluctuations in the first regulator voltage OUT1. In other words, the error amplifier ER1 generates the drive voltage V1 to turn OFF the transistor T1 when the first regulator voltage OUT1 is higher than the reference voltage Vref. This gradually lowers the first regulator voltage OUT1. The error amplifier ER1 generates the drive voltage V1 to turn ON the is transistor T1 when the first regulator voltage OUT1 is lower than the reference voltage Vref. This raises the first regulator voltage OUT1 with the input voltage VIN.

The switching regulator 120 is a DCDC converter that generates a substantially constant and stable second regulator voltage OUT2 from the input voltage VIN. The switching regulator 120 is similar to the switching regulator 14 of FIG. 1. That is, the switching regulator 120 includes the DCDC control circuit 22, the pre-driver 24, and the two series-connected transistors T2 and T3. The coil L1 is connected between the DCDC control circuit 22 and a node NC of the two transistors T2 and T3. The switching regulator 120 drives the transistors T2 and T3, generates the second regulator voltage OUT2 by charging current to the coil L1, and feeds back the second regulator voltage OUT2 to the DCDC control circuit 22 via the feedback loop FB2.

The DCDC control circuit 22 includes the error amplifier 22A and the signal processing circuit 22B, which are activated by the enable signal DDCEN having an H level in the same manner as in FIG. 1. The error amplifier 22A compares the second regulator voltage OUT2 received via the feedback loop FB2 with a desirable target voltage, or the reference voltage of the error amplifier 22A, and generates an amplification signal corresponding to the comparison result. The signal processing circuit 22B, which includes an oscillator and a PWM comparator (not shown), generates the pulse signal SP by combining the oscillation signal of the oscillator and the amplification signal of the error amplifier 22A with the PWM comparator. The pre-driver 24 generates drive signals VH and VL for driving the transistors T2 and T3 in a complementary manner in response to the pulse signal SP. Therefore, the DCDC control circuit 22 controls the driving time (on-duty) of each of the transistors T2 and T3 to maintain the second regulator voltage OUT2 at the desired target voltage.

The regulator circuit 100 generates the output voltage OUT using at least either one of the first regulator voltage OUT1, which is generated by the linear regulator 110, and the second regulator voltage OUT2, which is generated by the switching regulator 120. The regulator circuit 100 supplies the output voltage OUT to an internal circuit as operational power. For instance, the regulator circuit 100 generates the first regulator voltage OUT1 using the linear regulator 110 in a low load state, in which the internal circuit consumes a small amount of current, and generates the second regulator voltage OUT2 using the switching regulator 120 in a high load state. Furthermore, the regulator circuit 100 activates both of the linear regulator 110 and the switching regulator 120 at a predetermined timing when activating the switching regulator 120. This generates a synthesized voltage of the voltages OUT1 and OUT2 as the output voltage OUT.

The switching sequence of the regulator circuit 100 of FIG. 4 will now be described with reference to FIG. 5.

Figure 5:
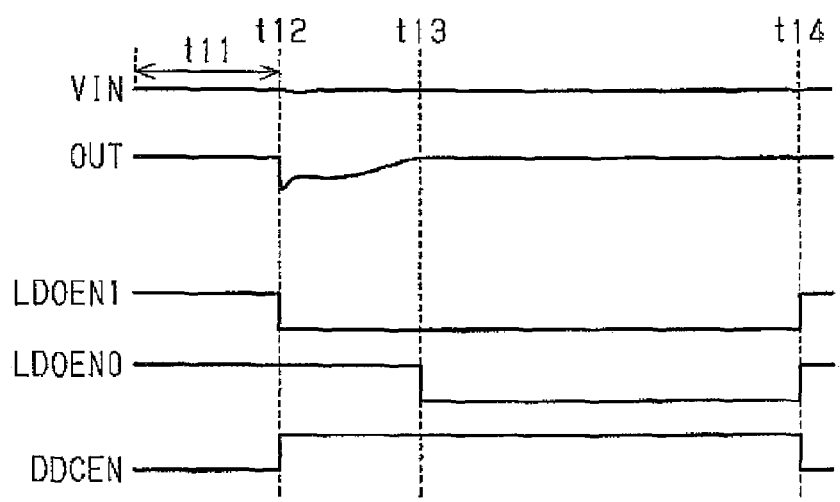
FIG. 5 is a timing chart showing a switching sequence of the regulator circuit of FIG. 4.

Referring to FIG. 5, during period t11, the linear regulator 110 is activated by an enable signal LDOEN0 having an H level, and the switching regulator 120 is inactivated by an enable signal DDCEN having an L level. The enable signal LDOEN1 has an H level, and the common terminal of the switch circuit SW1 is connected to the second switching terminal. Therefore, the error amplifier ER1 receives the feedback voltage of the first regulator voltage OUT1 through the second node NB between the resistors R2 and R3. The error amplifier ER1 compares the feedback voltage (i.e., potential of second node NB) and the reference voltage Vref to generate the drive voltage V1 based on the comparison result.

At time t12, the enable signal DDCEN rises and the enable signal LDOEN1 falls. As a result, the connection of the common terminal of the switch circuit SW1 is switched from the second switching terminal to the first switching terminal at substantially the same timing as when the switching regulator 120 is activated. The enable signal LDOEN0 is held at the H level. Therefore, the error amplifier ER1 receives the feedback voltage of the first regulator voltage OUT1 through the first node NA between the resistors R1 and R2. That is, the error amplifier ER1 receives the potential at the first node NA, which is higher than the potential at the second node NB, as the feedback voltage. Consequently, the target voltage of the linear regulator 110 (first regulator voltage OUT1 that is to be generated by the linear regulator 110) is lowered to the level expressed by the above equation 2.

Figure 2:
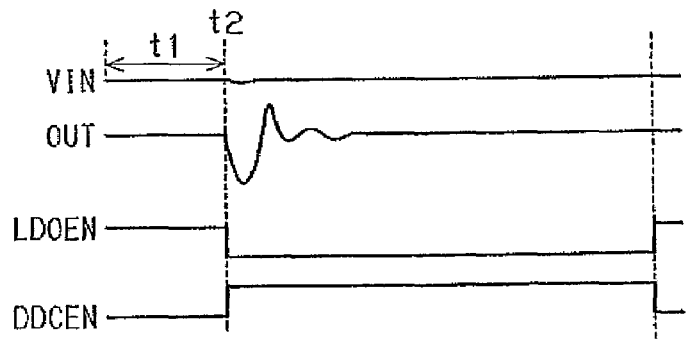
FIG. 2 is a timing chart showing a switching sequence of the regulator circuit of FIG. 1.
Figure 3:
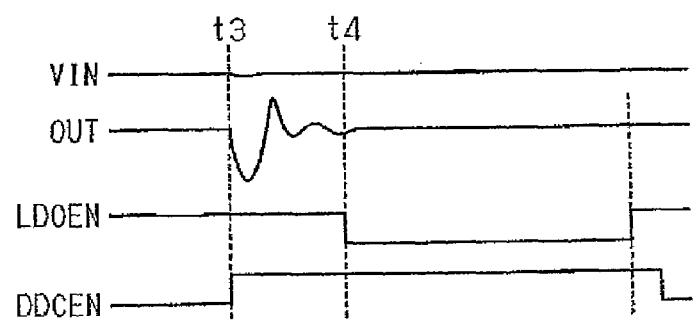
FIG. 3 is a timing chart showing another switching sequence of the regulator circuit of FIG. 1.

In this manner, the linear regulator 110 together with the switching regulator 120 operate in an overlapping manner when the switching regulator 120 is regulated so as to lower the target voltage of the linear regulator 110. As described above, the feedback control of the switching regulator 120 (i.e., feedback voltage of error amplifier 22A) is affected by the feedback control of the linear regulator 110 (i.e., feedback voltage of error amplifier ER1) when the feedback loops FB1 and FB2 are shared. Thus, the feedback loop FB2 is not stable and output noise is produced when the switching regulator is initially activated in the conventional regulator circuit 10 (see FIGS. 2 and 3).

To solve such a problem, the target voltage of the linear regulator 110 is lowered when the switching regulator 120 is initially activated in the regulator circuit 100 of the preferred embodiment. Specifically, the feedback voltage supplied to the error amplifier ER1 is raised by the loop control circuit 130, and the target voltage of the linear regulator 110 is lowered to the level expressed by equation 2. As a result, the feedback control of the linear regulator 110 prevents the control (feedback voltage) of the error amplifier 22A from becoming unstable. That is, the lowering of the target voltage for the linear regulator 110 compensates for an offset in the error amplifier 22A and stabilizes the feedback control of the switching regulator 120. This prevents output noise from being produced when the switching regulator 120 is initially activated. Furthermore, the linear regulator 110 maintains the output voltage OUT at the target voltage that is lowered by the loop control circuit 130 even if the output voltage OUT is lowered by the current charging the coil L1 when the switching regulator 120 is initially activated. This ensures that the output voltage OUT is prevented from decreasing to a value that is lower than or equal to the target voltage expressed by equation 2. As a result, a significant improvement is made to the voltage drop (undershoot) of the output voltage OUT in comparison with the voltage drop shown in FIGS. 2 and 3.

Subsequently, at time t13, the enable signal LDOEN0 falls, and the error amplifier ER1 is inactivated. The error amplifier ER1 is preferably inactivated when the coil L1 is charged by a predetermined amount of current, that is, when the feedback loop FB2 stabilizes. This timing (period between time t12 and time t13) is controlled by a timer and the like. In this case, the enable signal LDOEN0 automatically falls after a predetermined time elapses from when the enable signal LDOEN1 falls. By optimizing the overlapping period in such a manner, the switching regulator 120 is activated at a high speed.

At time t14, the enable signal DDCEN falls and the enable signals LDOEN0 and LDOEN1 rise. As a result, the linear regulator 110 is activated and the switching regulator 120 is inactivated. In this case, the common terminal of the switch circuit SW1 is connected to the second switching terminal. Therefore, the regulator circuit 100 generates the first regulator voltage OUT1 (output voltage OUT) with the linear regulator 110 in the same manner as during period t11.

The regulator circuit 100 of the preferred embodiment has the advantages described below.

The target voltage of the linear regulator 110 (first regulator voltage OUT1 that is to be generated by the linear regulator 110) is lowered by the loop control circuit 130 when the switching regulator 120 is initially activated. This compensates for an offset in the error amplifier 22A. In other words, the feedback control of the linear regulator 110 prevents the feedback control of the switching regulator 120 from becoming unstable. Accordingly, the generation of output noise during activation of the switching regulator 120 is suppressed.

The target voltage of the linear regulator 110 is lowered when the switching regulator 120 is initially activated. Thus, the output voltage OUT is prevented from being decreasing to a value that is lower than or equal to the target voltage of the linear regulator 110 even when the output voltage OUT is lowered by the current that charges the coil L1. Furthermore, such overlapping drive increases the speed for activating the switching regulator 120.

The loop control circuit 130 (i.e., the switching circuit SW1 and resistor circuit 132) is added to the conventional circuit. Thus, the configuration of the switching regulator 120 does not have to be changed to prevent noise.

It should be apparent to those skilled in the art that the present invention may be embodied in many other specific forms without departing from the spirit or scope of the invention. Particularly, it should be understood that the present invention may be embodied in the following forms.

The transistor T1 may be an n-channel MOS transistor. In this case, the input polarity of the error polarity ER1 is changed.

The resistor circuit 132 is not limited to the three resistors R1 to R3 and may be configured by only the resistors R2 and R3. In this case, the node (NA) between the resistor R2 and the drain of the transistor T1 is connected to the first switching terminal of the switch circuit SW1, and the node (NB) between the resistors R2 and R3 is connected to the second switching terminal of the switch circuit SW1.

The loop control circuit 130 is not limited to the resistor circuit 132 and the switch circuit SW1 and may be a clamp element (e.g., transistor) for clamping the feedback voltage of, for example, the first regulator voltage OUT1 to a predetermined potential.

The target voltage of the linear regulator 110 may be lowered by lowering the reference voltage Vref of the error amplifier ER1 during the activation of the switching regulator 120.

The timing at which the enable signal LDOEN1 falls and the timing at which the enable signal DDCDEN rises do not need to be exactly the same.

The current charging the coil L1 may be detected to lower the level of enable signal LDOEN0 based on the detection result.

The present examples and embodiments are to be considered as illustrative and not restrictive, and the invention is not to be limited to the details given herein, but may be modified within the scope and equivalence of the appended claims.

What is claimed is:

1. A regulator circuit for receiving an input voltage, the regulator circuit comprising:
    a linear regulator, including a first feedback loop, for generating a first regulator voltage from the input voltage with the first feedback loop;
    a switching regulator, including a second feedback loop connected to the first feedback loop, for generating a second regulator voltage from the input voltage with the second feedback loop; and
    a loop control circuit, connected to the first feedback loop, for controlling the first feedback loop to lower the first regulator voltage generated by the linear regulator when the switching regulator is activated;
    wherein the linear regulator includes:
    an error amplifier for receiving a reference voltage and a feedback voltage of the first regulator voltage via the first feedback loop and for generating an amplification voltage in accordance with the difference between the reference voltage and the feedback voltage; and
    a transistor for generating the first regulator voltage from the input voltage in response to the amplification voltage; and
    the loop control circuit controls the first feedback loop to raise the feedback voltage fed back to the error amplifier.

2. The regulator circuit according to claim 1, wherein the loop control circuit lowers the first regulator voltage generated by the linear regulator at substantially the same time as when the switching regulator is activated.

3. The regulator circuit according to claim 2, wherein the linear regulator is driven together with the switching regulator in an overlapping manner for a predetermined time, and the loop control circuit lowers the first regulator voltage generated by the linear regulator during the predetermined time.

4. A regulator circuit that receives an input voltage, the regulator circuit comprising:
    a linear regulator, including a first feedback loop, for generating a first regulator voltage from the input voltage by way of the first feedback loop;
    a switching regulator, including a second feedback loop connected to the first feedback loop, for generating a second regulator voltage from the input voltage by way of the second feedback loop; and
    a loop control circuit, connected to the first feedback loop, for controlling the first feedback loop to lower the first regulator voltage generated by the linear regulator when the switching regulator is activated;
    wherein the linear regulator includes:
    a first transistor having a first conductive terminal for receiving the input voltage, a second conductive terminal for outputting the first regulator voltage, and a control terminal; and
    an error amplifier having a first input terminal for receiving a reference voltage, a second input terminal, and an output terminal connected to the control terminal of the first transistor; and
    the loop control circuit includes:
    a resistor circuit arranged between the second conductive terminal of the first transistor and ground, the resistor circuit including a first resistor element connected to the second conductive terminal, a second resistor element connected to the ground, and a third resistor element connected between the first and second resistor elements; and
    a switch circuit having a first switching terminal connected to a node between the first and third resistor elements, a second switching terminal connected to a node between the second and third resistor elements, and a common terminal connected to the second input terminal of the error amplifier.

5. The regulator circuit according to claim 4, wherein the switching regulator includes:
    a DCDC control circuit, connected to the first resistor element, for generating a pulse signal;
    a pre-driver, connected to the DCDC control circuit, for generating a first drive signal and a second drive signal with the pulse signal;
    a second transistor for receiving the input voltage and activated and inactivated in response to the first drive signal; and
    a third transistor connected between the second transistor and a ground and activated and inactivated in response to the second drive signal.

6. The regulator circuit according to claim 5, further comprising:

a coil connected between the DCDC control circuit and a node of the second and third transistors and charged with current corresponding to the input voltage;

wherein the switch circuit connects the common terminal to the first switching terminal at substantially the same time as when the coil is charged with current; and the error amplifier is inactivated when the current charging the coil reaches a predetermined energy amount.

7. A method for controlling a regulator circuit receiving an input voltage and including a linear regulator and a switching regulator, the method comprising:

generating a first regulator voltage from the input voltage by activating the linear regulator, wherein the linear regulator includes a first feedback loop;

generating a second regulator voltage from the input voltage by activating the switching regulator wherein the switching regulator includes a second feedback loop, the second feedback loop being connected to the first feedback loop; and controlling the first feedback loop to lower the first regulator voltage generated by the linear regulator when the switching regulator is activated, and wherein the linear regulator includes:

an error amplifier for receiving a reference voltage and a feedback voltage of the first regulator voltage via the first feedback loop and for generating a drive voltage according to the difference between the reference voltage and the feedback voltage; and a transistor for generating the first regulator voltage from the input voltage in response to the drive voltage; and controlling the first feedback loop includes raising the feedback voltage that is fed back to the error amplifier.

8. The method according to claim 7, wherein controlling the first feedback loop includes lowering the first regulator voltage generated by the linear regulator at substantially the same time as when the switching regulator is activated.

9. The method according to claim 8, further comprising:

driving the linear regulator together with the switching regulator in an overlapping manner for a predetermined time; and lowering the first regulator voltage generated by the linear regulator during the predetermined time.

* * * * *